United States Patent
O'Toole et al.

(10) Patent No.: US 9,652,918 B2
(45) Date of Patent: May 16, 2017

(54) PAIRABLE SECURE-ACCESS FACILITIES

(71) Applicant: EBAY INC., San Jose, CA (US)

(72) Inventors: Christopher Diebold O'Toole, Cedar Park, TX (US); Bryant Genepang Luk, Round Rock, TX (US); Robert He, Pflugerville, TX (US); Richard Chapman Bates, Austin, TX (US); Jennifer T. Brenner, Austin, TX (US); Yu Tang, Round Rock, TX (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 15/352,380

(22) Filed: Nov. 15, 2016

(65) Prior Publication Data

US 2017/0061721 A1 Mar. 2, 2017

Related U.S. Application Data

(63) Continuation of application No. 14/557,331, filed on Dec. 1, 2014, now Pat. No. 9,542,784.

(51) Int. Cl.
*G07C 9/00* (2006.01)

(52) U.S. Cl.
CPC ............ *G07C 9/00309* (2013.01); *G07C 2009/00769* (2013.01)

(58) Field of Classification Search
CPC ...... G07C 9/00309; G07C 2009/00928; G07C 9/00182; G07C 9/00111; G07C 2009/00793; G07C 5/008; G07C 2009/00769
USPC ........................................................ 340/5.61
See application file for complete search history.

(56) References Cited

U.S. PATENT DOCUMENTS

| | | | |
|---|---|---|---|
| 6,754,472 B1 | 6/2004 | Williams et al. | |
| 7,176,782 B2 | 2/2007 | Shitan | |
| 7,684,769 B2 | 3/2010 | Song et al. | |
| 8,037,511 B1 | 10/2011 | Lundy et al. | |
| 8,161,781 B2 | 4/2012 | Gokcebay | |
| 8,994,827 B2 * | 3/2015 | Mistry | H04N 5/2252 348/158 |
| 9,024,749 B2 * | 5/2015 | Ratajczyk | G08B 7/06 340/539.11 |

(Continued)

OTHER PUBLICATIONS

Moon et al., "Wearable polyimide-PDMS electrodes for intrabody communication", Journal of Micromechanics and Microengineering, Jan. 29, 2010, pp. 1-11, IOP Publishing Ltd, United Kingdom.

(Continued)

*Primary Examiner* — Mark Blouin

(57) ABSTRACT

Systems and methods are provided for providing access to secure-access facilities based on pairing of the secure-access facilities with a user device such as a wearable device. A pairable secure-access facility may be a public storage facility or device such as a locker that includes communications circuitry for pairing with the user device. Once paired with the user device, the locker may operate a locking mechanism to lock the locker when the user device is away from the locker and to unlock the locker when the user device is in the vicinity of the locker. The locker may include a beacon for detecting and pairing with the user devices. Pairing the user device and the locker may include entering a locker identifier into the user device to ensure that the intended user device is paired with the intended locker.

20 Claims, 7 Drawing Sheets

(56) References Cited

U.S. PATENT DOCUMENTS 9,191,988 B2 * 11/2015 Newham ............... H04W 88/04
9,224,257 B2    12/2015 Smith et al.
9,273,493 B2     3/2016 Kim
9,317,018 B2 *  4/2016 Spodak .................... G05B 1/01

OTHER PUBLICATIONS

McKenna Phil, "Human arm transmits broadband", New Scientist, Mar. 10, 2010, 2 pages [online], [retrieved on Aug. 8, 2016]. Retrieved from the Internet: <URL:https://www.newscientist.com/article/dn18648-human-arm-transmits-broadband>.

* cited by examiner

PAIRABLE SECURE-ACCESS FACILITIES

CROSS REFERENCE TO RELATED APPLICATION

This application is a continuation of U.S. patent application Ser. No. 14/557,331, filed Dec. 1, 2014, now issued U.S. Pat. No. 9,542,784, which is hereby incorporated by reference in its entirety.

TECHNICAL FIELD

The present invention generally relates to secure public storage facilities and, more particularly, to temporal pairing of a user device with a pairable secure-access facility.

BACKGROUND

Public locations such as train stations often provide lockers for temporary individual use by a user. When a user wishes to gain access to a public locker, the user commonly has to obtain a physical key or a code in order to access the locker once it is locked, often following payment for a temporary rental of the locker. Payment for a locker typically includes inserting coins or other currency into the locker, or paying by credit card for the rental. However, physical keys and codes can be cumbersome and can easily be lost. It would therefore be desirable to be able to provide improved secure storage for users in public places.

Figure 1:
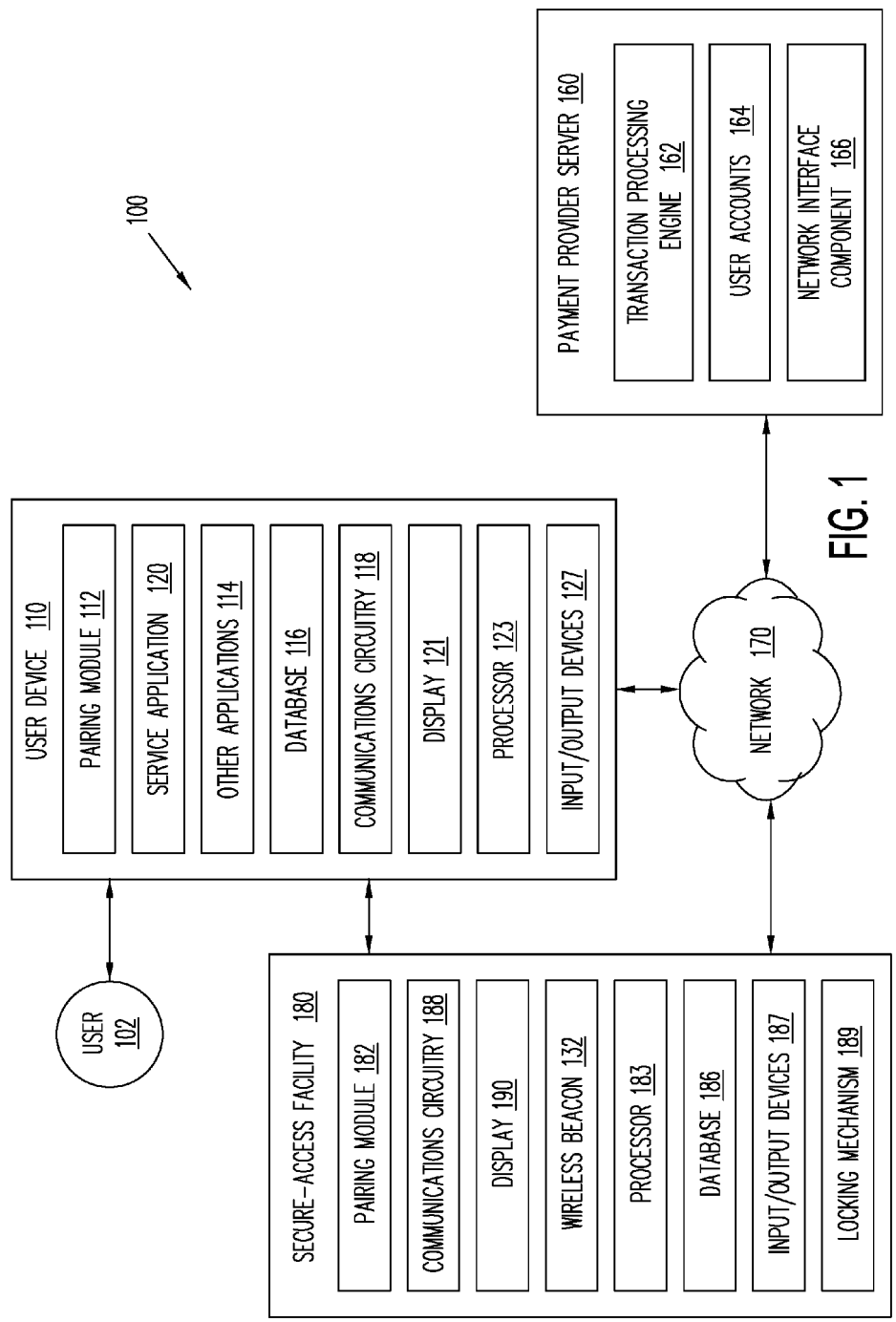
FIG. 1 is a block diagram of an illustrative networked system including a secure-access facility, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Secure-access facilities such as secure storage facilities may be provided to users in public places such as train stations, airports, recreational areas, campgrounds, parks, amusement parks, theme parks, truck stops, rest stops, sporting events, concerts, arenas, or other areas. For example, travelers often desire a secure place to store their luggage while awaiting transportation or while visiting a new location. A train station or an airport may include secure storage facilities such as lockers that can be rented by the travelers for temporary secure storage of their luggage. The secure public storage may include a beacon or other communications circuitry for pairing the secure public storage with a user device such as a wearable user device. The pairable secure public storage may be locked and/or unlocked based on the pairing. For example, when a user rents a locker, the user may pair their wearable device with the locker. When the user removes the wearable device from the locker, the user device and the locker may lose communication and the locker may lock. When the user returns to the locker and places the wearable device in the vicinity of the locker, the wearable device and the locker may reestablish communications, and the locker may unlock and/or open. In this way, the user can be provided with an electronic key to the secure public storage without requiring the user to carry a physical key or an additional device, and/or remember a code.

In some implementations, pairable secure storages such as a locker may require the user to provide feedback information to confirm the pairing. For example, the locker may have a locker number and/or may generate a unique code such as PIN number and, in order to pair the user device with the locker, the user may be required to enter the locker number and/or code into the user device to be communicated wirelessly to the locker. Providing pairable secure storage with feedback from the user for pairing in this way may help prevent third party access to the pairing or pairing with the wrong locker by helping to ensure that only the intended user device is paired with the intended locker that is providing the locker number or code.

Entry of the code into the user device can be done via an on-screen pin pad (e.g., a virtual number pad with integers from 0-9), or through other means such as tapping of the user device (e.g., a locker may be configured to detect 1-9 quick taps to enter each digit of the locker number and/or PIN) against the pairable secure-access facility.

In one embodiment, pairing of a pairable secure-access storage may be completed using a short series of small electric currents sent along the user's hand and/or arm from the locker that are detected by the wearable device. Data can be encoded in this series of currents which could be sent back to the locker to verify that this wearable is the one which should be paired with.

Once paired, a locked secure storage facility may then require the presence of the paired wearable device to unlock the locker. Prior to pairing, when the locker is unused, a wearable device may be detected in the vicinity of the locker and the locker may trigger a pairing process with the wearable device.

Although secure storage facilities such as lockers are sometimes discussed herein as examples, this is merely illustrative. Other secure-access facilities may also be pairable secure-access facilities such as parking garages, truck stop showers, truck stop or airport rental beds or sleeping areas, mailboxes, restrooms or restroom stalls, or other secure areas that can be locked and/or unlocked based on pairing with a user device such as a wearable user device.

FIG. 1 is a block diagram of a networked system 100 suitable for implementing processes for providing pairable secure-access facilities such as pairable secure storage facilities, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 may include one or more user devices such as user device 110. The user device may be a wearable device such as a watch, glasses, a ring, a necklace, a glove, a nametag, a shirt, or other electronic device that can be worn on a portion of a person's body or clothing.

System 100 may also include a payment provider server 160 and a pairable secure-access facility such as secure-access facility 180. Payment provider server 160, secure-access facility 180 and/or user device 110 may be in communication over a network 170. User 102 (e.g., a visitor to a service location such as a traveler at a train station or a member of a gym), may utilize their corresponding user device 110 to access secure-access facility 180. Secure-access facility 180 may be located at a merchant location or other service location such as a store, a hotel, a restaurant, a train station, a ship, a park, a campground, an airport, an entertainment location such as an arena, a stadium, a theater, an amusement park, a bank, or any other location at which a person may desire to temporarily store one or more personal items or otherwise access a secure area in public place.

For example, secure-access facility 180 may be a locker at a train station and user 102 may desire to temporarily store luggage in the locker. The traveler may use user device 110 (e.g., a wearable device) to access locker 180 by pairing the user device with the locker. In another example, a truck driver may desire to access a private rentable sleeping and/or bathing area at a truck stop. The truck driver may use user device 110 (e.g., a wearable device) to access the private sleeping or bathing area by pairing the user device with an access point of the private sleeping or bathing area.

As shown in FIG. 1, secure-access facility 180 may include communications equipment such as communications circuitry 188 and/or one or more beacons such as wireless beacon 132. Communications circuitry 188 and/or beacon 132 may include wireless communications equipment such as short range wireless communications equipment or other wireless communications equipment. Wireless communications equipment that may be included in a beacon such as beacon 132 may include Bluetooth Low Energy (BLE) beacon communications equipment, LTE Direct communications equipment, Near Field Communications (NFC) equipment, wireless local area network equipment (e.g., WiFi based equipment), cellular network equipment, global positioning system (GPS) equipment, combined cellular and GPS equipment, other radio or microwave based communications equipment, infrared communications equipment, and/or any combination thereof. In some embodiments, beacon 132 may include relatively short range wireless communications equipment such as Bluetooth Low Energy (BLE) beacon communications equipment, LTE Direct communications equipment, and/or Near Field Communications (NFC) equipment and communications circuitry 188 may include relatively wider range wireless communications circuitry such as wireless local area network equipment (e.g., WiFi based equipment), cellular network equipment, global positioning system (GPS) equipment, and/or combined cellular and GPS equipment. However, this is merely illustrative. In general, any suitable arrangement of communications equipment may be provided in secure-access facility 180 for providing pairing and paired access capabilities with a user device.

As shown in FIG. 1, secure-access facility 180 may include a pairing module 182, a processor 183, a database 186, and a display 190. Pairing module 182 may be implemented as software running on processor 183 and/or a dedicated hardware module for managing pairing operations for facility 180 in cooperation with, for example, beacon 132. Pairing module 182 may cooperate with beacon 132 to emit a signal (e.g., a BLE communications signal and/or an NFC signal) that is receivable by a user device. The emitted signal may include an identifier for the beacon and/or the associated facility 180. A user device such as a wearable user device may passively monitor for beacon communications such as BLE communications or other near field communications from, for example, a pairable secure-access facility (e.g., a locker).

When, for example, a user device 110 detects a beacon signal from beacon 132 and verifies the identifier as belonging to a locker, both the user device and the beacon in the locker may ramp up in power and establish a connection. The connection may further enable the user device to communicate with one or more other servers such as payment provider server 160. Beacon 132 may be connected to a networked device at the location of facility 180 or the beacon may include network functionality to communicate with the payment provider server. The payment provider server may be a server of a dedicated service provider for secure public storage (e.g., a locker space vendor) or may be general service provider (e.g., a train station or shopping mall) or a payment provider that additionally provides secure public storage at the service provider's locations.

User device 110, locker 180, and payment provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software such as hardware and software configured for wired and/or wireless communication with beacon 132, secure-access facility 180, and/or payment provider server 160. For example, in various embodiments, user device 110 may be implemented as a smart phone, a personal digital assistant (PDA), a laptop computer, a tablet computer, a wearable device such as a wristwatch or bracelet with appropriate computer hardware resources, a ring with appropriate computer hardware resources, eyeglasses with appropriate computer hardware (e.g. GOOGLE GLASS®) and/or other types of computing devices capable of transmitting and/or receiving data, such as an IPHONE® or an IPAD® from APPLES. The user device may be managed or controlled by any suitable processing device.

As shown in FIG. 1, user device 110 may include a pairing module 112, a service application 120, other applications 114, a database 116, a display 121, one or more processors such as processor 123, and communications circuitry 118 (sometimes referred to as a communications module). Pairing module 112, service application 120, and other applications 114 may correspond to and/or include processes, procedures, and/or applications executable by a hardware processor, for example, a software program and/or may be implemented as dedicated hardware modules.

Pairing module 112 may be used by user device 110 to establish a connection between user device 110 and secure-access facility 180. Pairing module 112 may correspond to a specific software application or hardware module utilized by user device 110 to complete a pairing with secure-access facility 180. The pairing may provide and/or verify an identity of user device 110, including transmission of an identifier for user device 110. Pairing module 112 may also correspond to an application available over the Internet for download from a service provider server or payment provider server 160. Pairing module 112 may utilize communications circuitry 118 to exchange short range wireless communications with beacon 132 and/or communications circuitry 188 of secure-access facility 180 to complete a pairing process. Beacon 132 may be configured to transmit an identifier such as a locker name, a locker brand, or a locker number reception and identification by user device 110 and/or user 102.

Pairing application 112 may execute in the background of an operating system of user device 110 and be configured to establish connections, using communication module 118, with one or more beacons 132 (e.g., wireless beacons) of secure-access facility 180. The connection may be established with or without user input from user 102. For example, beacon 132 may broadcast a token, such as a universally unique identifier (UUID), for reception by pairing module 112. Pairing module 112 may utilize communication module 118 of the user device 110 to receive the token from beacon 132. If pairing module 112 acknowledges the UUID as identifying facility 180, pairing module 112 may transmit an identifier corresponding to user device 110 back to beacon 132. Pairing module 112 may utilize communication module 118 to communicate with beacon 132 (e.g., over near field communication, Bluetooth, Bluetooth Low Energy, radio, infrared, WiFi, cellular, GPS, combined cellular and GPS, microwave, a combination thereof, or other connection). The identifier from user device 110 may include, be transmitted with, concatenated with, or otherwise bundled with the identifier received from beacon 132.

Secure-access facility 180 may operate display 190 to provide the locker number or other unique identifier such as a PIN number or passcode to user 102. User 102 may enter the provided locker number or identifier into user device 110 using, for example, input/output devices 127 (e.g., a real or virtual keypad, a button, a switch, a touchscreen, etc.). The entered number or identifier may be transmitted using communications circuitry 118 to beacon 132 or the user may use user device 110 to directly enter the provided number or code to beacon 132 (e.g., by tapping user device 110 against beacon 132 so that the number or code may be entered by proximity based communication between communications circuitry 118 and beacon 132).

Once a connection is established with beacon 132, user device 110 may be paired with secure-access facility 180. The pairing process may then associate that user device 110 with the beacon 132 and/or facility 180. In such embodiments, pairing module 112 of user device 110 may utilize short range wireless communication with beacon 132 and/or communications circuitry 188, such as near field communication, Bluetooth, Bluetooth Low Energy, radio, infrared, WiFi, cellular, GPS, combined cellular and GPS, microwave, a combination thereof, or other connection.

Pairing module 112 may utilize communication module 118 to pass information such as user information to payment provider server 160, including information for processing a payment for temporary access to secure-access facility 180 based on the pairing. User device 110 may communicate directly with payment provider server 160 through network 170 and/or via secure-access facility 180 (e.g., using beacon 132 and/or communications circuitry 188). For example, user 102 may be provided with the ability to access and pay for rental of a locker using a single pairing operation between user device 110 and secure-access facility 180 in which payment processing information is also exchanged with payment provider server 160 during, before and/or after the pairing operation.

User device 110 may include other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, mobile wallet, payment method selection, and/or other applications. Other applications 114 may include browser and/or mapping applications where the functions are not provided by pairing module 112 and/or service application 120. Other applications 114 may contain software programs, executable by a processor, including a graphical user interface (GUI) configured to provide an interface to the user.

User device 110 may further include memory such as database 116 which may include, for example, identifiers such as operating system registry entries, cookies associated with pairing module 112, service application 120, and/or other applications 114, identifiers associated with hardware of user device 110, or other appropriate identifiers, such as identifiers used for payment/user/device authentication or identification. Database 116 may include user device tokens and/or encryption keys, including a public key of secure-access facility 180 for beacon 132. Database 116 may include identifying information for tokens enabling pairing module 112 to identify beacon 132 when receiving a corresponding token. In one embodiment, identifiers in database 116 may be used to associate user device 110 with a particular user account 164 maintained by payment provider server 160. Database 116 may further include online account access information.

User device 110 may include a communication module 118 adapted to communicate with beacon 132 and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, WiFi, cellular, GPS, combined cellular and GPS, microwave, near field communication devices, and/or a combination thereof. Communication module 118 may communicate directly with beacon 132 without network 170 using short range wireless communications.

Beacon 132 may cooperate with pairing module 182 to pair the locker 180 with the user device when the user device 110 is in proximity to beacon 132. Secure-access facility 180 may be maintained, for example, by a service location and/or a payment provider associated with payment provider server 160. Beacon 132 may be implemented using any appropriate hardware and software configured for wireless communication with user device 110. For example, in one embodiment, beacon 132 may be implemented as a dongle device including a hardware processor and a communication module, for example, connected to secure-access facility 180. Beacon 132 may also act as a stand-alone device including a processor, communication module, and/or network interface component configured to communicate with user device 110 and/or payment provider server 160, (e.g., by communicating through LTE Direct). Although a single beacon is described, a plurality of beacons may be included in secure-access facility 180. Beacon 132 may communicate with payment provider server 160 to enable payment provider server 160 to associate a particular user 102 with a location at which a secure-access facility is located.

Beacon 132 of FIG. 1 may include processes, procedures, and/or applications executable by a hardware processor, for example, a software program, configured to interact with user devices 110. Beacon 132 may include applications for transmitting requests to establish a connection between a user device and beacon 132. Thus, beacon 132 may utilize a low energy short range wireless communication of beacon 132 to transmit requests to establish a connection with user device 110, including an identifier such as a Universally Unique Identifier (UUID). If user device 110 receives a request to establish the connection with beacon 132 and respond with a device identifier (potentially including the UUID and other information to effectuate a pairing of each device), beacon 132 may ramp up in power and create a connection between user device 110 and beacon 132.

Beacon 132 may transmit the request to establish the connection with user device 110 as a short range communication (e.g. a BLE protocol communication) including a "wake up" process for pairing module 112 of user device 110 and/or a token for beacon 132 or secure-access facility 180. In other embodiments, the request and/or connection may be transmitted using near field communication, radio communication, infrared communication, or Bluetooth communication, BLE communication, WiFi communication, cellular communication, GPS communication, microwave communication, and/or any suitable combination thereof.

After beacon 132 receives a device identifier, beacon 132 may determine that user device 110 is at or in proximity to secure-access facility 180. In one embodiment, beacon 132 may pass the user device identifier to payment provider server 160 to complete the pairing and payment process and associate user device 110 with that facility 180. However, this is merely illustrative. In some embodiments, pairing of user device 110 with secure-access facility 180 may be performed without communication with payment provider server 160. For example, the user may pay separately for a locker rental and pairing operations may be performed exclusively using communications between user device 110 and facility 180.

Secure-access facility 180 may utilize communications circuitry 188 to pass information to payment provider server 160 and/or beacon 132 may utilize a network connection of beacon 132 through a communication module of beacon 132 to communicate with payment provider server 160. Additionally, beacon 132 may keep a communication channel open between user device 110 and payment provider server 160 for passing information to and from the device.

Communications circuitry 188 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, BLE, cellular, GPS, combined cellular and GPS, microwave, near field communication devices, and/or any combination thereof. Communications circuitry 188 may communicate directly with user device 110 without network 170 using short range wireless communications.

Secure-access facility 180 may be maintained by anyone or any entity that establishes and/or maintains secure-access locations such as lockers in a location such as a location with services and/or products offered to users. Secure-access facility 180 may include a pairing module 182, input/output device 187 (e.g., a real or virtual keypad, one or more buttons, switches or touchscreens), a database 186, a processor 183, and a locking mechanism 189. Pairing module 182 may correspond to processes, procedures, and/or applications executable by a hardware processor, for example, a software program.

Pairing module 182 may perform to processes to complete pairing with user device 110. Thus, pairing module 182 may be configured to transmit and/or receive pairing requests from user devices such as user device 110 and complete the pairing requests. In one embodiment, a pairing request may include log-in information for a user account 164 of payment provider server 160. Pairing may include verifying the account information. However, in embodiments where a user account has not been previously established by user 102, pairing module 182 may receive other information for identifying user 102 or user device 110, such as user names/identifiers, user device identifiers, or other information.

Additionally, pairing module 182 may unpair user device 110 when user device 110 leaves the proximity of beacon 132, when the user's paid time runs out, or when the user removes their belongings from or otherwise leaves the secure-access facility. Locking mechanism 189 may be a mechanical lock, an electromagnetic lock, or other suitable structures and/or circuitry operable to lock and unlock facility 180 (e.g., a lockable opening to a secure internal cavity, room, or other space). For example, locking mechanism 189 may include a bolt or other physically actuatable member coupled to a motor or other mechanism for actuating the bolt to a locked or unlocked position. In another example, locking mechanism 189 may include magnetic structures coupled to circuitry for alternately magnetizing or demagnetizing or more of the magnetic structures to secure or release an electromagnetic bond between the magnetic structures (e.g., opposing magnetic structures on a lockable opening such as a door and a frame of a locker or magnetic structures within a door of a locker that are operable to fix or release a door handle for opening the locker).

In various embodiments, secure-access facility 180 may include other applications and/or modules as may be desired in particular embodiments to provide features to secure-access facility 180. For example, other applications may include security applications for implementing server-side security features, programmatic server applications for interfacing with appropriate application programming interfaces (APIs) over network 170, or other types of applications. Other applications may contain software programs, executable by a processor, including a graphical user interface (GUI), configured to provide an interface to a user.

Secure-access facility 180 may include a database 186 which may include, for example, identifiers such as operating system registry entries, cookies associated with pairing module 182, identifiers associated with hardware of secure-access facility 180, or other appropriate identifiers, such as identifiers used for pairing/payment/user/device authentication or identification. Database 186 may store identifiers and/or user accounts of user 102, which may comprise an identifier for user 102 and/or user device 110. In various embodiments, identifiers in database 186 may be used by a payment/credit provider, such as payment provider server 160, to associate user 102 with a particular account maintained by a payment provider server 160. For example, an identifier for a payment account with a payment provider server 160 may be stored with a user account and/or identifiers of users 102 in database 186. In other embodiments, a user account stored in database 186 may include a shared identifier with the payment account with a payment provider server 160. Identifiers stored in database 186 may be temporarily stored while a particular user owns access to the secure-access facility 180 and may be erased or replaced when a subsequent user rents or purchases access to the secure-access facility 180.

Payment provider server 160 may include a payment provider server maintained, for example, by an online payment service provider, which may provide user account and payment services on behalf of user 102 and other users. In this regard, a payment provider server 160 includes one or more processing applications, which may provide payment for items using a user account with that payment provider server 160. In one example, payment provider server 160 may be provided by PAYPAL®, Inc. of San Jose, Calif., USA. Although payment provider server 160 is described as separate from secure-access facility 180, payment provider server 160 may be operated by a common entity with secure-access facility 180 or a separate entity from secure-access facility 180. For example, a payment provider may provide secure-access facilities for use by users via device pairing at a location, a payment provider may provide payment operations for a third party provider of secure-access facilities for use by users via device pairing at a location, or secure-access facilities for use by users via device pairing at a location may be provided independent of any involvement of a payment provider.

Payment provider server 160 may include a transaction processing engine 162, a database of user accounts 164, and a network interface component 166. Transaction processing engine 162 may correspond to processes, procedures, and/or applications executable by a hardware processor, for example, a software program or to dedicated hardware systems. In other embodiments, payment provider server 160 may include additional or different software or hardware as required.

Transaction processing engine 162 may be configured to receive information from one or more user devices 110 and/or secure-access facility 180 for processing and completion of financial transactions. Transaction processing engine 162 may include one or more modules to process financial transactions between user devices 110 and/or service provider server 140. Financial transactions may include financial information corresponding to user debit/credit card information, checking account information, a user account (e.g., payment account with a payment provider server 160), or other payment information. Transaction processing engine 162 may complete the financial transaction for the purchase request by providing payment secure-access facility 180 or an operator thereof. In various embodiments, transaction processing engine 162 may provide transaction histories, including receipts, to user device 110 in order to provide proof of purchase for temporary access to secure-access facility 180.

Additionally, a payment provider server 160 includes user accounts 164. As previously discussed, user 102 may establish one or more user accounts with a payment provider server 160. User accounts 164 may include user information, such as name, address, birthdate, payment/funding information, travel information, additional user financial information, and/or other desired user data.

In various embodiments, payment provider server 160 may include at least one network interface component 166 adapted to communicate with user device 110, and/or secure-access facility 180 over network 170. In various embodiments, network interface component 166 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), infrared (IR), BLE, cellular, GPS, combined cellular and GPS, microwave, and/or near field communication devices, and/or any combination thereof.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
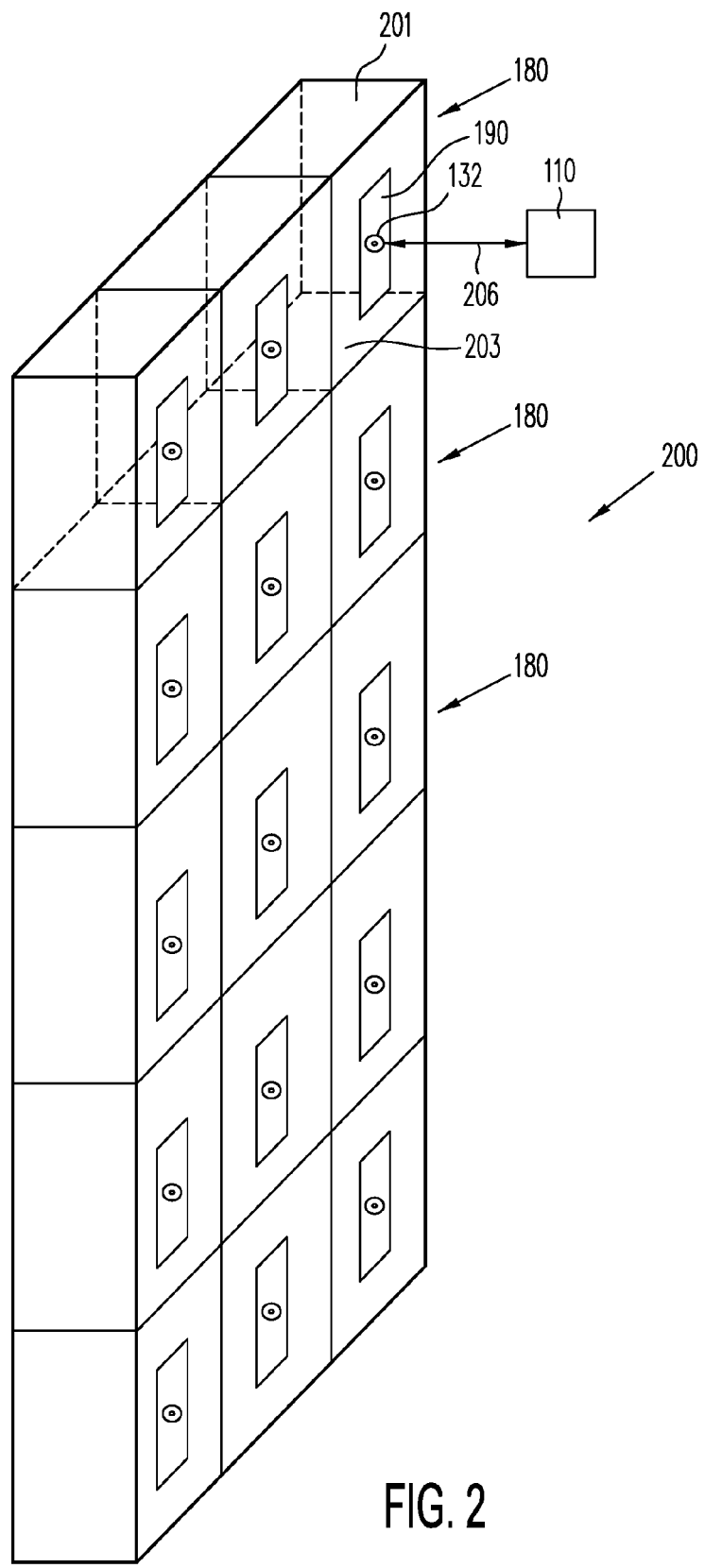
FIG. 2 is a diagram of an illustrative locker having a beacon for pairing with a wearable user device, according to an embodiment.

FIG. 2 is a diagram of a plurality of exemplary secure-access facilities 180 implemented as lockers in a locker bank 200. Locker bank 200 may be located in any suitable location such as an airport, a train station, an amusement park, a campground, a hotel, a swimming pool facility or the like. As shown in FIG. 2, each locker 180 may include a display 190 and communications circuitry such as a wireless beacon 132 and/or other communications circuitry such as NFC circuitry for communications 206 between user device 110 and locker 180. Each locker 180 may include a lockable opening such as a door 203 that provides access to an internal cavity 201 in which items such as personal belongings can be securely stored when door 203 is locked (e.g., using locking mechanism 189 of FIG. 1, not shown in FIG. 2). It should be appreciated that other lockable openings can be provided for a locker 180 or other secure-access facility such as a gate, a lever arm, a turnstile, another hinged barrier, or other lockable opening.

When user device 110 is placed in the vicinity of a particular locker 180 (e.g., within range of communications with beacon 132 such as within 1 centimeters (cm), within 1 inch, within 4 cm, within 10 cm, or within 100 cm), user device 110 and that locker 180 may be paired. As described in further detail herein, during pairing operations, display 190 may display a locker identifier such as a locker number or other numerical or alphanumeric code to the user of user device 110. While the locker identifier is displayed, the user may enter the locker identifier into user device 110 (or directly into locker 180 using device 110). The locker identifier may be transmitted to locker 180 from user device 110 so that locker 180 can identify which user device with which to pair.

Once paired, when the user removes user device 110 from the vicinity of locker 180, locker 180 may actuate a locking mechanism to lock locker 180. Access to that locker 180 may then require that the user return user device 110 to the vicinity of that locker 180. When the user device 110 that has been paired with that locker 180 is returned to within the vicinity of that locker, the locker may actuate the locking mechanism to unlock the locker. For example, a pairing module of the locker may be configured to operate the mechanism to unlock the lockable opening when the user device is paired with the beacon and when the user device is in communication with the beacon and/or to lock the lockable opening when the user device is paired with the beacon and when the user device is not in communication with the beacon.

Locker 180 and/or user device 110 may store pairing information for the other so that the locker and the user device remain bonded and, when the user device is returned to the vicinity of locker 180, communications can be reestablished for unlocking the locker. The pairing information may be stored for a limited time. For example, if the user rents a locker for three hours based on a pairing with their user device, the locker may store pairing information for that user device for three hours. In this example, at the end of the three hours, the pairing information may be deleted or blocked so that the user would be required to pay for additional time and, in some scenarios, re-pair the user device and the locker to regain access to the locker.

Figure 3:
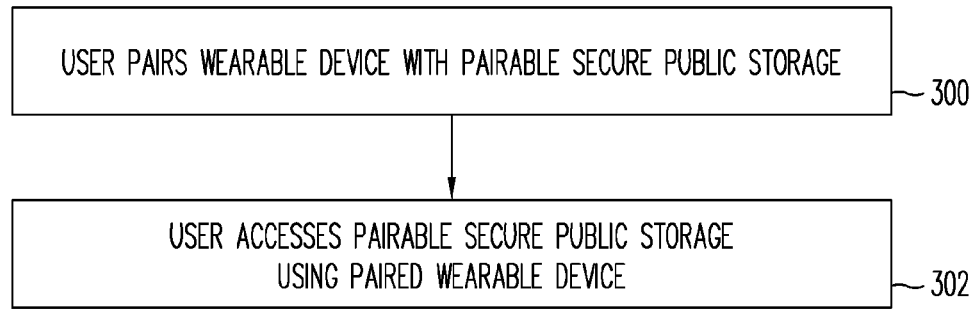
FIG. 3 is a flowchart of an exemplary process for using a pairable secure-access facility, according to an embodiment.

Illustrative steps that may be performed by a user for using a pairable secure-access facility such as a pairable secure public storage facility are shown in FIG. 3.

At step 300, a user may pair a user device such as a wearable device with a pairable public storage. Pairing the wearable device with the pairable public storage may include placing the wearable device in the vicinity of the pairable public storage and entering a code provided from the pairable public storage into the wearable device. Pairing the wearable device with the pairable public storage may also include providing payment for temporary or permanent rental of the pairable public storage. Providing payment may include providing payment directly to a point of sale device on the locker or the payment may be automatically provided by a payment provider server in communication with the locker responsive to the pairing. For example, the user may have an account with the payment provider server and may have a pre-authorization for locker rentals or other transactions with the payment provider server. When the wearable user device is paired with the locker, the user device or the locker may transmit a notification to the payment provider server to process a payment from a user account of the user to an account of an operator of the pairable lockers. In various embodiments, the pairable locker maybe a specific one assigned to the user (such as when the user prepays or reserves a locker) or selectable from a group of lockers (such as at an amusement park, where the user can simply select one that is open).

At step 302, the user may access the pairable public secure storage using the paired wearable device. For example, when the user returns to obtain one or more items from the locker, if the user is wearing or carrying the previously paired user device, the user may simply open the locker that has been unlocked based on the detected proximity of the wearable device when the user approaches.

Figure 4:
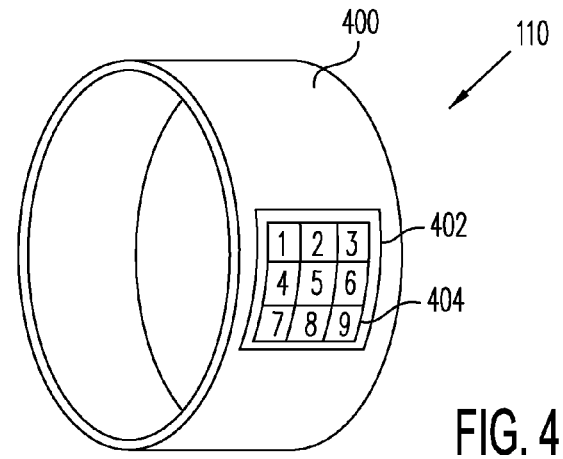
FIG. 4 is a diagram of an illustrative wearable device, implemented as a watch device, for pairing with a pairable secure-access facility, according to an embodiment.
Figure 5:
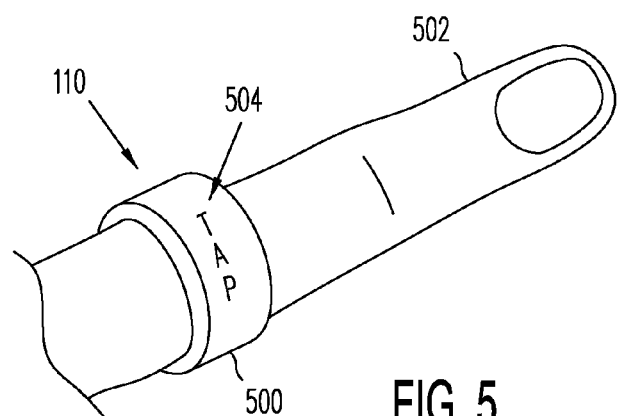
FIG. 5 is a diagram of an illustrative wearable device, implemented as a ring device, for pairing with a pairable secure-access facility, according to an embodiment.
Figure 6:
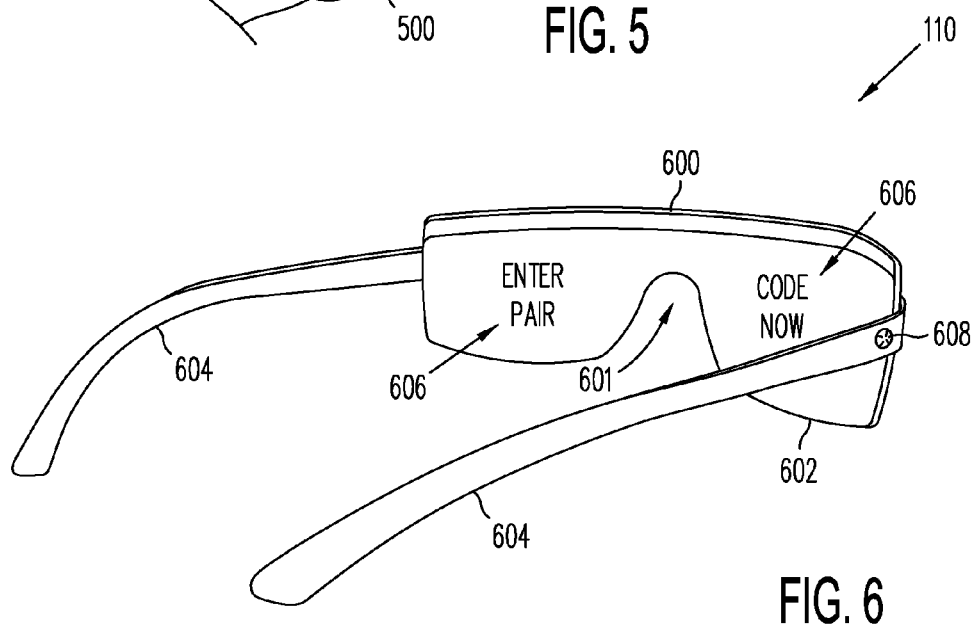
FIG. 6 is a diagram of an illustrative wearable device, implemented as an eyeglass device, for pairing with a pairable secure-access facility, according to an embodiment.

FIGS. 4, 5, and 6 show exemplary implementations of a user device configured to be wearable and pairable with a pairable secure-access facility as described herein.

In the example of FIG. 4, user device 110 is implemented as an electronic wristwatch having a housing 400 that is adapted to be worn around a person's wrist. As shown in FIG. 4, a display 402 (e.g., an implementation of display 190 of FIG. 1) may be provided in housing 400. A virtual keypad 404 may be provided to the user with display 402. The virtual keypad may be used to enter a locker number or other code or PIN provided by a pairable secure-access facility for pairing of the electronic watch with the pairable secure-access facility as described herein.

In the example of FIG. 5, user device 110 is implemented as an electronic ring having a housing 500 that is adapted to be worn around a person's finger such as finger 502. As shown in FIG. 5, a display 504 (e.g., an implementation of display 190 of FIG. 1) may be provided in housing 500. Display 504 may be used provide instructions to the user (e.g., the display may present images or text such as "TAP") indicating that the user should tap the electronic ring against a secure-access pairable facility to enter a locker number or other code or PIN provided by the pairable secure-access facility for pairing of the electronic ring with the pairable secure-access facility as described herein.

In the example of FIG. 6, user device 110 is implemented as electronic eyeglass having a frame 600 that is adapted to be worn on a person's face. For example, frame 600 may include arms 604 that are adapted to extend over a person's ears. One or more lenses (e.g., transparent or semitransparent plastic or glass) 602 may extend from frame 600 so that a wearer of the glasses looks through lenses 602. The glasses may include a central portion 601 (e.g., a portion of the lenses or an additional member mounted to or between the lenses) that is adapted to rest on a person's nose to support lenses 602 in front of the user's eyes.

As shown in FIG. 6, lenses 602 may be implemented as a display (e.g., an implementation of display 190 of FIG. 1) for the eyeglasses. For example, text such as text 606 (e.g., "ENTER PAIR CODE NOW") may be projected onto or emitted from display pixels within lenses 602 such that a wearer of the eyeglasses can view and read the text. One or more buttons such as button 608 may be provided with which the user can enter information such as a locker number or other code or PIN provided by a pairable secure-access facility for pairing of the electronic eyeglasses with the pairable secure-access facility as described herein. In another embodiment, the electronic eyeglasses may include a camera or other eye monitoring equipment that can detect input from the user based on eye movements and/or blinking.

Figure 7:
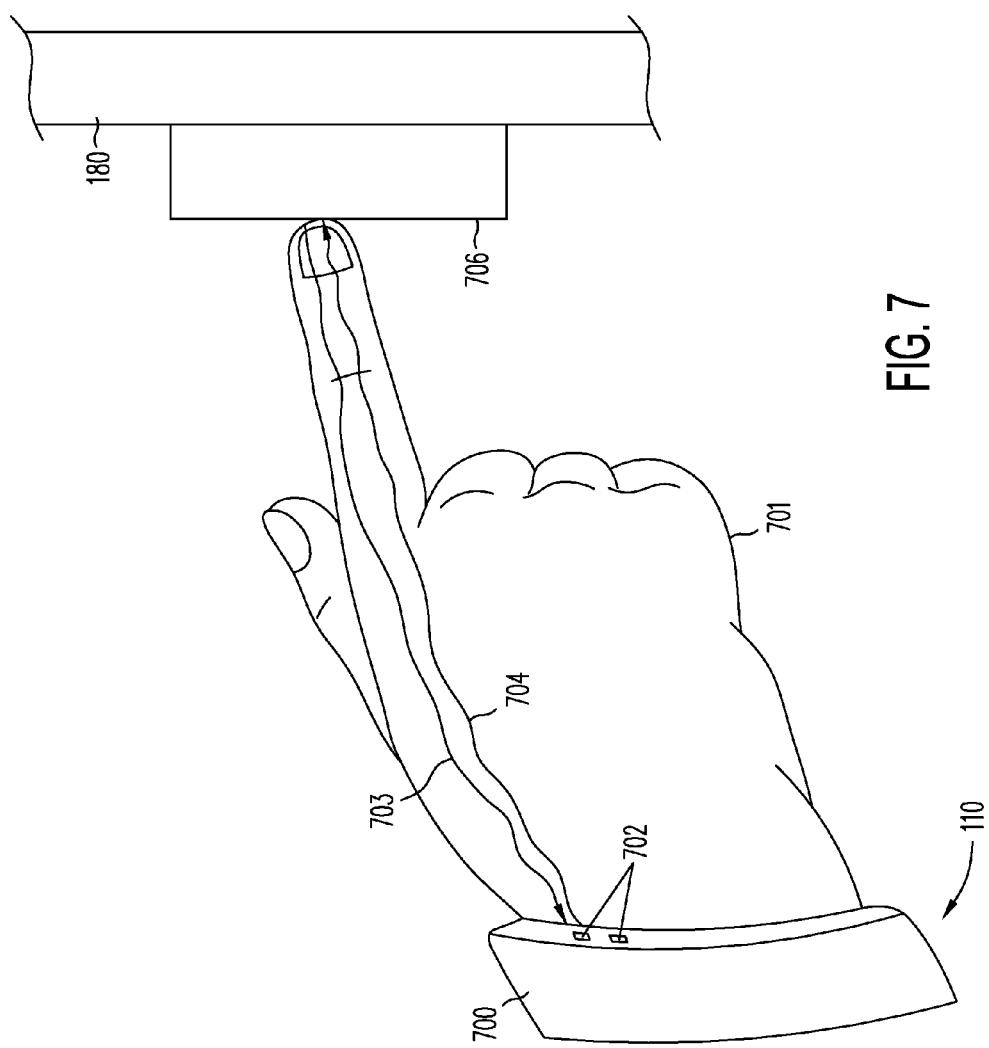
FIG. 7 is a diagram of an illustrative wearable device for pairing with a pairable secure-access facility showing how the wearable device may generate a current that passes along the wearer's skin to the pairable secure-access facility, according to an embodiment.

As noted above, in one embodiment, a wearable user device may communicate directly with a pairing module on a pairable secure-access facility using electronic signals exchanged between the wearable user device and the pairable secure-access facility over, for example, the wearer's skin. FIG. 7 shows an exemplary implementation of user device 110 for pairing with a pairable secure-access facility using electronic signals transmitted over the wearer's skin. In the example of FIG. 7, user device 110 is implemented as an electronic wristwatch having a housing 700 adapted to fit around a person's wrist.

As shown in FIG. 7, device 110 may include one or more electrodes 702. Electrodes 702 may be arranged to send and receive electrical signals such as signals 703 and 704 that travel along the skin of the user's hand 701. For example, when a user wishes to pair user device 110 with a pairable secure-access facility 180, the user may contact a pairing module 706 on the pairable secure-access facility 180 with their skin (e.g., with a finger as shown in FIG. 7).

Pairing module 706 may include circuitry that transmits a signal 703 such as a current that is received by electrodes 702 and processed by a processor (e.g., processor 183 and/or pairing module 112 of FIG. 1) of the user device. Signal 703 may include an identifier of that particular pairable secure-access facility 180. User device 110 may transmit a signal 704 that includes the identifier or other information based on the identifier to circuitry of pairing module 706 using electrodes 702. Signals 703 and 704 may be exchanged in addition to other pairing communications between a beacon of the pairable secure-access facility and communications circuitry of the user device and may be used in addition to or in place of a PIN entry to verify pairing of the intended user device with the intended pairable secure-access facility.

Figure 8:
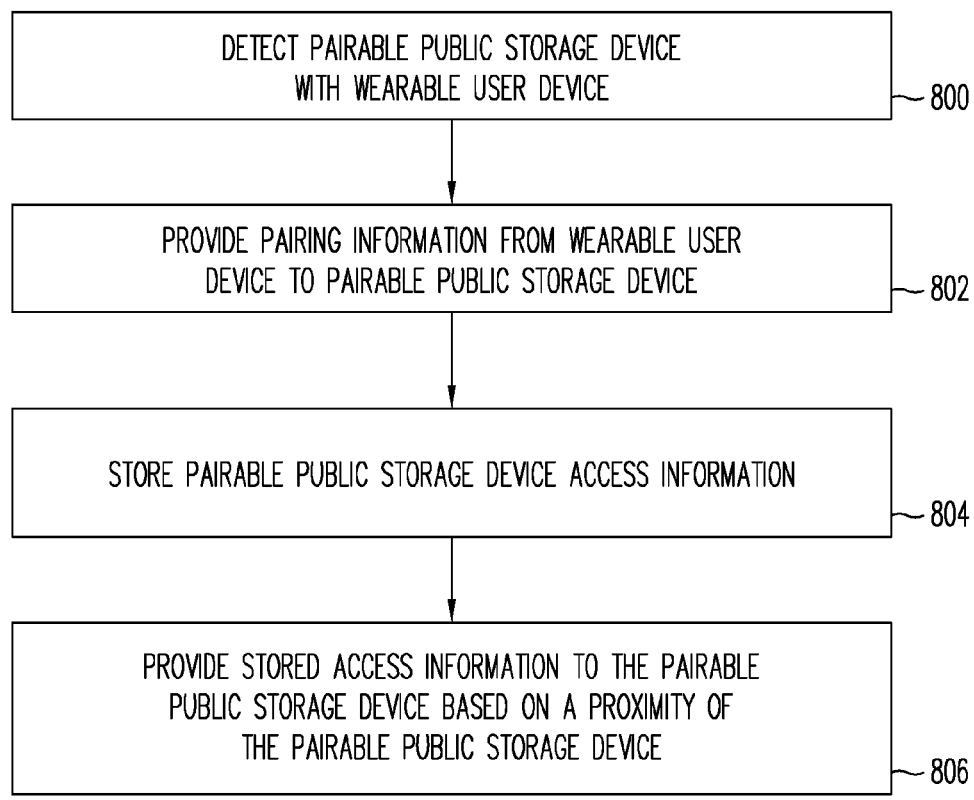
FIG. 8 is a flowchart of an exemplary process that may be performed by a wearable device to pair with a pairable secure-access facility, according to an embodiment.

Illustrative steps that may be performed by a user device such as a wearable user device for obtaining access to a pairable secure-access facility based on pairing with the pairable secure-access facility are shown in FIG. 8.

At step 800, a pairable secure-access facility such as a pairable public storage device (e.g., a locker, a restroom, a bicycle locker or other pairable secure-access facility as described herein) may be detected with a wearable user device. Detecting the pairable secure-access facility may include receiving, with communications circuitry of the wearable user device a signal transmitted by the pairable secure-access facility while the wearable user device is in proximity to the pairable secure-access facility.

At step 802, pairing information may be provided from the wearable user device to the pairable public storage device. For example, the pairing information may include automatically transmitted information for pairing operations (e.g., a user device identifier) and may include a storage device identifier or PIN that has been entered into the wearable user device by the user based on a display of the information by the pairable public storage device. As another example, the pairing information may include a storage device identifier or PIN that is entered via one or more taps with the wearable user device (e.g., as described above in connection with FIG. 5) against the pairable public storage device. As another example, the pairing information may include a storage device identifier or PIN that is exchanged between the wearable user device and the pairable public storage device using electrical signals transmitted over the wearers skin (e.g., as described above in connection with FIG. 7).

At step 804, pairable public storage device access information may be stored on the wearable user device. The pairable public storage device access information may include encrypted or unencrypted information generated based on the pairing of the wearable user device and the pairable public storage device such as an access code to be transmitted to the pairable public storage device when the pairable public storage device is again detected (e.g., when the user returns to the locker to open the locker). In this way, the wearable user device and the pairable public storage device may remain bonded even when the wearable user device is separated from the pairable public storage device.

At step 806, the stored access information may be provided from the wearable user device to the pairable public storage device based on a proximity of the pairable public storage device. For example, when the user returns to a locker that has been paired and is bonded with their user device, the wearable user device may again detect the pairable public storage device in the vicinity of the wearable user device. Responsive to the detection, the wearable user device may transmit (e.g., using BLE communications) the stored access information so that the user can access the pairable public storage device.

Figure 9:
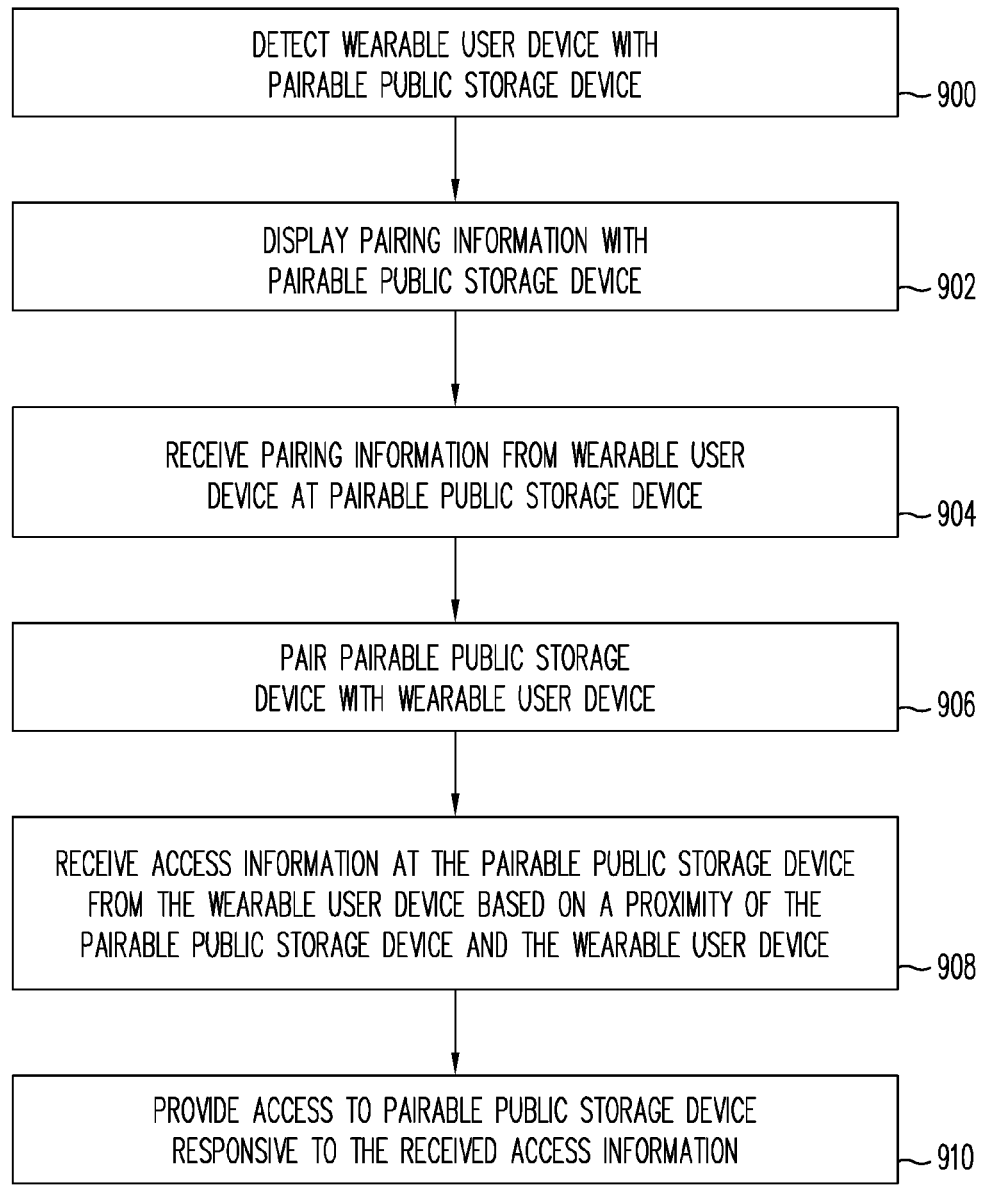
FIG. 9 is a flowchart of an exemplary process that may be performed by a pairable secure-access facility to pair with wearable device of a user, according to an embodiment.

Illustrative steps that may be performed by a pairable secure-access facility for providing access to the pairable secure-access facility based on pairing with a user device such as a wearable user device are shown in FIG. 9.

At step 900, a user device such as a wearable user device may be detected by a pairable secure-access facility such as a pairable public storage device (e.g., a locker, a restroom, a bicycle locker or other pairable secure-access facility as described herein). Detecting the wearable user device may include receiving, with communications circuitry of the pairable secure-access facility signals transmitted by the wearable user device while the wearable user device is in proximity to the pairable secure-access facility.

At step 902, pairing information may be displayed by the pairable public storage device. For example, a display of the pairable public storage device may be used to present a locker number or other unique identifier of the pairable public storage device to the wearer of the wearable user device.

At step 904, the pairing information that was displayed may be received from the wearable user device at the pairable public storage device. For example, the pairing information may be received following transmission of the pairing information from the wearable user device as described, for example, in connection with step 802 of FIG. 8.

At step 906, the pairable public storage device may be paired with the wearable user device. Pairing the pairable public storage device with the wearable user device may include generating and/or providing pairable public storage device access information to the wearable user device that can be stored by the user device and returned to the pairable public storage device when the user device is in the vicinity of the pairable public storage device.

While the user device stores the pairable public storage device access information and while the pairable public storage device maintains that access information as an access key for granting access to the pairable public storage device, the wearable user device and the pairable public storage device may remain bonded so that, when the user device is in the vicinity (e.g., within communications range of communications circuitry such as NFC circuitry and/or BLE circuitry of the pairable public storage device) of the pairable public storage device, the pairable public storage device may be unlocked and when the user device is away from the pairable public storage device (e.g., outside the communications range), the pairable public storage device may be locked. In another embodiment, while the pairable public storage device and user device are bonded, the user may be provided with options (e.g., on a display of the user device) for unlocking or locking the storage device even while the user device is within the vicinity of the storage device.

At step 908, pairable public storage device access information may be received from the wearable user device at the pairable public storage device based on a proximity of the pairable public storage device and wearable user device. For example, when the user returns to a bonded locker, the wearable user device may again detect the pairable public storage device in the vicinity of the wearable user device. Responsive to the detection, the wearable user device may transmit (e.g., using BLE communications) the stored access information and the pairable public storage device may receive the transmitted information.

At step 910, the pairable public storage device may provide access to the pairable public storage device responsive to the received access information. For example, the pairable public storage device may receive the access information from the user device, verify that the access information is valid access information for that device and that pairable public storage device, and operate a locking mechanism to unlock the pairable public storage device to provide the access.

Thus, a user may determine which user device the user wishes to pair with the locker, based on various factors, including what will be most convenient for the user. For example, if the user is planning to exercise or swim, the user may select a ring as the pairing device. In that case, the user does not have to carry around a phone, watch, or other device that may be damaged or stolen while the user is engaged in an activity.

Figure 10:
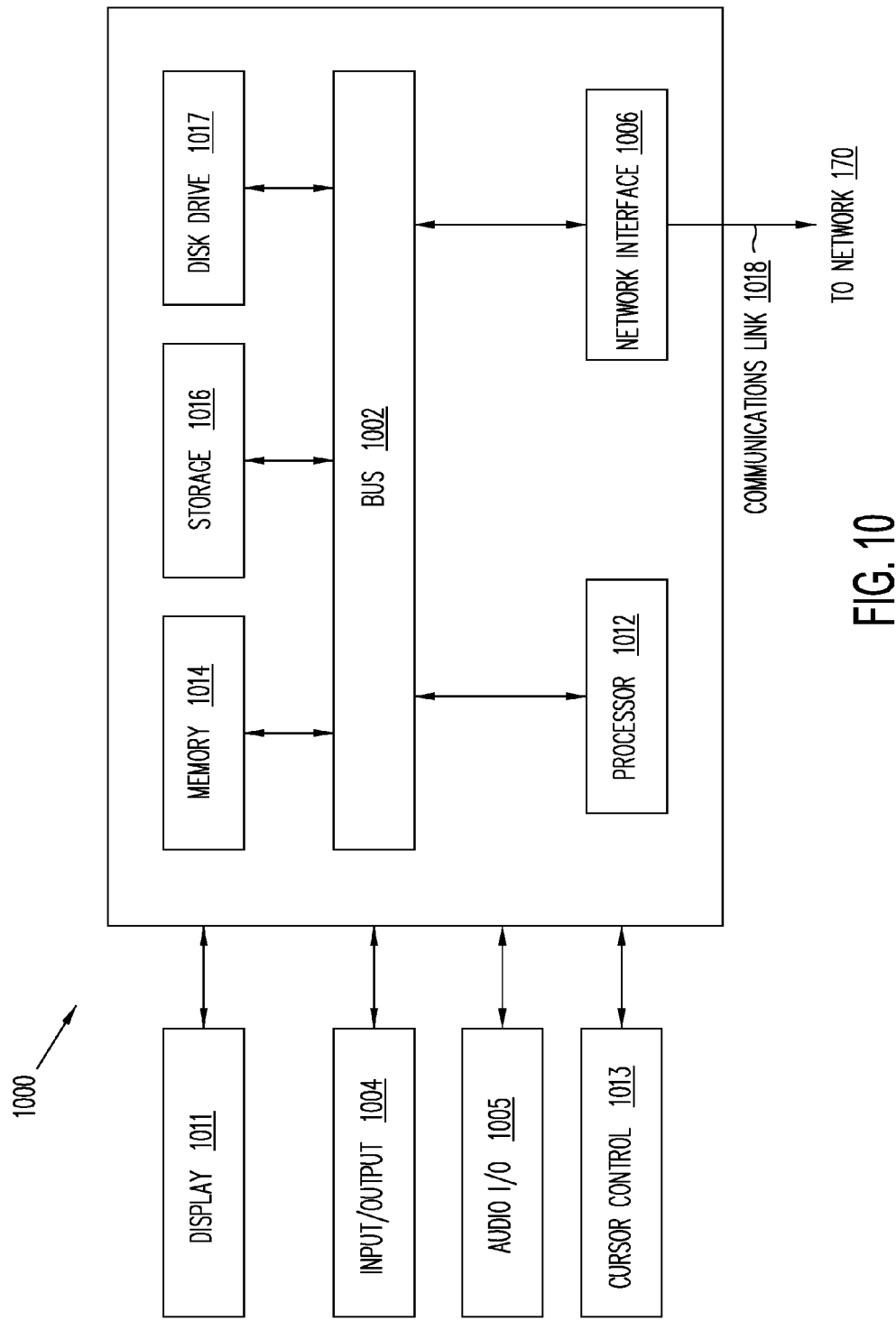
FIG. 10 is a block diagram of a computer system suitable for implementing one or more components of FIG. 1, according to an embodiment.

FIG. 10 is a block diagram of a computer system suitable for implementing one or more components in FIG. 1, according to an embodiment. It should be appreciated that each of the devices utilized by users and service providers may be implemented as computer system 1000 in a manner as follows.

Computer system 1000 includes a bus 1002 or other communication mechanism for communicating information data, signals, and information between various components of computer system 1000. Components include an input/output (I/O) component 1004 that processes a user action, such as selecting keys from a keypad/keyboard, selecting one or more buttons, image, or links, and/or moving one or more images, etc., and sends a corresponding signal to bus 1002. I/O component 1004 may also include an output component, such as a display 1011 and a cursor control 1013 (such as a keyboard, keypad, mouse, etc.). An optional audio input/output component 1005 may also be included to allow a user to use voice for inputting information by converting audio signals. Audio I/O component 1005 may allow the user to hear audio. A transceiver or network interface 1006 transmits and receives signals between computer system 1000 and other devices, such as another user device, a merchant device, or a service provider server via network 170. In one embodiment, the transmission is wireless, although other transmission mediums and methods may also be suitable. One or more processors 1012, which can be a micro-controller, digital signal processor (DSP), or other processing component, processes these various signals, such as for display on computer system 1000 or transmission to other devices via a communication link 1018. Processor(s) 1012 may also control transmission of information, such as cookies or IP addresses, to other devices.

Components of computer system 1000 also include a system memory component 1014 (e.g., RAM), a static storage component 1016 (e.g., ROM), and/or a disk drive 1017. Computer system 1000 performs specific operations by processor(s) 1012 and other components by executing one or more sequences of instructions contained in system memory component 1014. Logic may be encoded in a computer readable medium, which may refer to any medium that participates in providing instructions to processor(s) 1012 for execution. Such a medium may take many forms, including but not limited to, non-volatile media, volatile media, and transmission media. In various embodiments, non-volatile media includes optical or magnetic disks, volatile media includes dynamic memory, such as system memory component 1014, and transmission media includes coaxial cables, copper wire, and fiber optics, including wires that comprise bus 1002. In one embodiment, the logic is encoded in non-transitory computer readable medium. A non-transitory computer-readable medium may include instructions which, in response to execution by a computer system, cause the computer system to perform some or all of one or more methods as described herein. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 1000. In various other embodiments of the present disclosure, a plurality of computer systems 1000 coupled by communication link 1018 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A pairable secure-access facility, comprising:
   an internal cavity;
   a lockable opening to the cavity;
   a mechanism for locking and unlocking the lockable opening;
   a communication device comprising an electrode; and
   a pairing module configured to:
      transmit, via the electrode of the communication device, a first electrical signal to a user device along a portion of a user's skin, the first electrical signal comprising an identifier associated with the pairable secure-access facility;
      receive, via the communication device, the identifier from the user device;
      in response to receiving the identifier, transmit, via the communication device, access information to the user device to associate the user device with the pairable secure-access facility;
      receive, via the communication device, the access information from the user device; and
      in response to receiving the access information, operate the mechanism to unlock the lockable opening.

2. The pairable secure-access facility of claim 1, wherein the pairing module is further configured to:
   operate the mechanism to unlock the lockable opening when the user device is associated with the pairable secure-access facility and the user device is in communication with the communication device; and
   operate the mechanism to lock the lockable opening when the user device is associated with the pairable secure-access facility and the user device is not in communication with the communication device.

3. The pairable secure-access facility of claim 1, wherein the pairable secure-access facility comprises a locker, and wherein the user device is a wearable device.

4. The pairable secure-access facility of claim 1, wherein the pairing module is further configured to receive the identifier from the user device by detecting, via the electrode of the communication device, a second electrical signal comprising the identifier transmitted from the user device along the portion of the user's skin.

5. The pairable secure-access facility of claim 1, wherein the communication device further comprises wireless communications equipment, and wherein the pairing module is further configured to receive the identifier from the user device by receiving, via the wireless communications equipment of the communication device, a wireless signal comprising the identifier from the user device.

6. The pairable secure-access facility of claim 1, wherein the pairing module is further configured to receive the access information from the user device by detecting, via the electrode of the communication device, a second electrical signal comprising the access information transmitted from the user device along the portion of the user's skin.

7. The pairable secure-access facility of claim 1, wherein the communication device further comprises wireless communications equipment, and wherein the pairing module is further configured to receive the access information from the user device by receiving, via the wireless communications equipment of the communication device, a wireless signal comprising the access information from the user device.

8. The pairable secure-access facility of claim 7, wherein the wireless communications equipment comprises near field communications (NFC) circuitry, and wherein the pairing module is further configured to receive the access information from the user device by receiving, via the NFC circuitry of the communication device, an NFC signal comprising the access information from the user device when the user device is tapped against the pairable secure-access facility.

9. A user device comprising:
   a communication device comprising an electrode; and
   a pairing module configured to:
      detect, via the electrode of the communication device, a first electrical signal along a portion of a user's skin transmitted from a pairable secure-access facility, the first electrical signal comprising an identifier associated with the pairable secure-access facility;
      transmit, via the communication device, the identifier to the pairable secure-access facility;
      receive, via the communication device, access information to associate the user device with a pairable secure-access facility; and
      transmit, via the communication device, the access information to the pairable secure-access facility to cause the pairable secure-access facility to unlock.

10. The user device of claim 9, wherein the user device is a wearable device, and wherein the user device further comprises a hardware memory configured to store the access information.

11. The user device of claim 9, wherein the paring module is further configured to transmit the identifier to the pairable secure-access facility by transmitting, via the electrode of the communication device, a second electrical signal comprising the identifier along the portion of the user's skin to the pairable secure-access facility.

12. The user device of claim 9, wherein the communication device further comprises wireless communications equipment, and wherein the paring module is further configured to transmit the identifier to the pairable secure-access facility by transmitting, via the wireless communications equipment of the communication device, a wireless signal comprising the identifier to the pairable secure-access facility.

13. The user device of claim 9, wherein the pairing module is further configured to transmit the access information to the pairable secure-access facility by transmitting, via the electrode of the communication device, a second electrical signal comprising the access information along the portion of the user's skin to the pairable secure-access facility.

14. The user device of claim 9, wherein the communication device further comprises wireless communications equipment, and wherein the paring module is further configured to transmit the identifier to the pairable secure-access facility by transmitting, via the wireless communications equipment of the communication device, a wireless signal comprising the identifier to the pairable secure-access facility.

15. A method for providing access to a pairable secure-access facility, the method comprising:
   transmitting, via an electrode of a communication device of the pairable secure-access facility, a first electrical signal to a user device along a portion of a user's skin, the first electrical signal comprising an identifier associated with the pairable secure-access facility;
   receiving, via the communication device, the identifier from the user device;
   in response to receiving the identifier, transmitting, via the communication device, access information to the user device to associate the user device with the pairable secure-access facility;

receiving, via the communication device, the access information from the user device; and in response to receiving the access information, operating a locking mechanism of the pairable secure-access facility to unlock the pairable secure-access facility.

16. The method of claim 15, wherein the pairable secure-access facility comprises a locker, and wherein the operating comprises:

operating the locking mechanism to unlock the locker when the user device is within a communication distance from the communication device of the pairable secure-access facility; and operating the locking mechanism to lock the locker when the user device is outside the communication distance from the communication device of the pairable secure-access facility.

17. The method of claim 15, wherein receiving the identifier from the user device comprises detecting, via the electrode of the communication device, a second electrical signal comprising the identifier transmitted from the user device along the portion of the user's skin.

18. The method of claim 15, wherein receiving the identifier from the user device comprises receiving, via wireless communications equipment of the communication device, a wireless signal comprising the identifier from the user device.

19. The method of claim 15, wherein receiving the access information from the user device comprises detecting, via the electrode of the communication device, a second electrical signal comprising the access information transmitted from the user device along the portion of the user's skin.

20. The method of claim 15, wherein receiving the access information from the user device comprises receiving, via wireless communications equipment of the communication device, a wireless signal comprising the access information from the user device.

* * * * *